March 6, 1928.

O. P. SMITH 1,661,273

DOOR CLOSING MECHANISM

Filed Aug. 12, 1926

Inventor
O. P. Smith;
By Chester W. Brown
Attorney

Patented Mar. 6, 1928.

1,661,273

UNITED STATES PATENT OFFICE.

OWEN P. SMITH, OF MIAMI, FLORIDA; HANNAH M. SMITH ADMINISTRATRIX OF SAID OWEN P. SMITH, DECEASED.

DOOR-CLOSING MECHANISM.

Application filed August 12, 1926. Serial No. 128,808.

My invention relates to means for providing for the concealment of the lure in dog racing courses, after the race has been completed.

One object is to provide a door through which said lure may be conducted at the completion of the race.

Another object is to provide automatic means for closing said door after the lure has passed through it.

With the above and other objects in view, which will more particularly appear in the accompanying specification, I have illustrated in the drawings accompanying one embodiment of my invention as used by me in my dog racing courses. It will be apparent that the form may be altered to meet the requirements for other purposes without departing from the spirit of my invention.

Like numerals of reference indicate similar parts throughout the various views in the accompanying drawings, in which, Figure 1 is a perspective showing part of the housing and the door shown in closed position.

Figure 2:
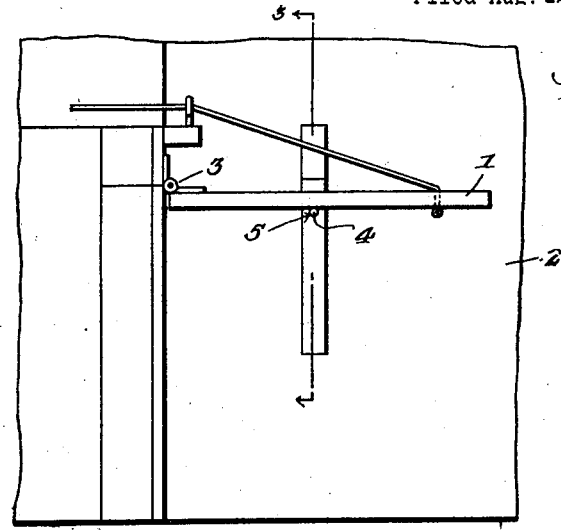
Figure 2 is an elevation showing the door open and taken from one side.

I have shown in the accompanying drawings the form of my invention as employed by me in my dog racing courses as shown in various patents issued to me. In these race courses the general plan is to have a lure carried around the race course by means of an electric car. The electric car and the rail track upon which it is operated, are usually concealed by means of a housing, the only parts being visible being the arm extending out on the course, and the lure mounted at the end of the arm. When the predetermined course has been run by the dogs, it is necessary to conceal the lure in order that the dogs will stop for lack of an object to puruse, and as the dogs are following at a speed of approximately sixty feet a second, and are only twenty to thirty feet behind the lure, it will be apparent that the lure must be concealed very quickly to prevent the dogs from following through the opening through which the lure has passed.

To accomplish this purpose, I have provided a suitable switch in the rail track (not shown) which can be operated by hand, and after the race has started, this switch can be thrown to switch the car upon the side track provided. A door 1 is provided at a suitable distance from the switch for the lure to pass through the housing 2 and be concealed behind said door, said door also preventing the dogs pursuing said lure further. The housing 2 which has an inclined top as clearly illustrated in Fig. 3 of the drawing, is provided with an angle to receive the door which is arranged at right angles to the side of the housng as clearly shown in Fig. 2 of the drawing. The arrangement of the transversely disposed door in the angle of the housing will permit the car to travel along the side of the housing and carry the lure past the door so that the door will conceal the lure and prevent access of the dogs to the same. To operate this door in the short space of time permitted between the passage of the lure and the approach of the dogs, I have preferably mounted it by means of spring actuated hinges at the top at 3, 3, whereby the door is operated not only by gravity, when released by the means hereinafter described, but also by the springs in the hinges. This provides a very quick, positive, and certain means of closing it against entry of the dogs.

Figure 4:
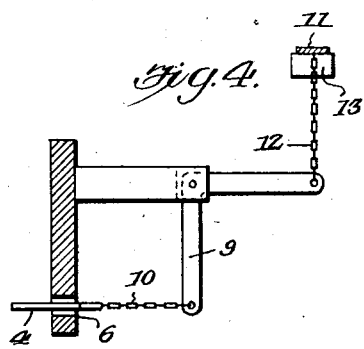
Fig. 4 is a detail horizontal sectional view illustrating the bell crank connection between the contact lever and the supporting rod.
Figure 1:
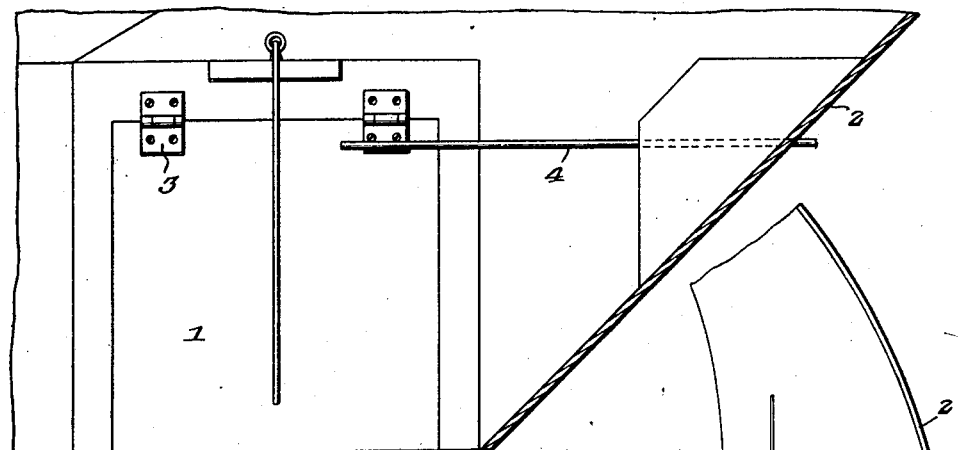
Figures 3, 5:
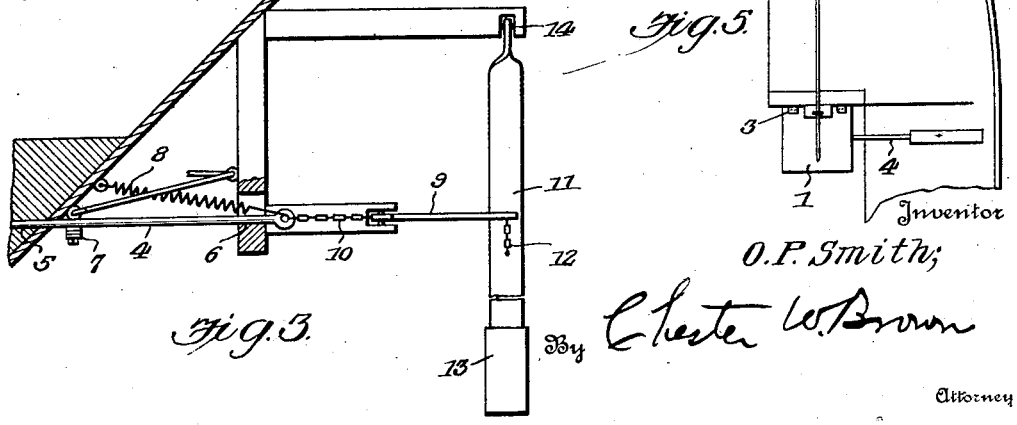
Fig. 3 is a vertical sectional view on the line 3—3 of Fig. 2.
Fig. 5 is a diagrammatic view illustrating the arrangement of the device with relation to the housing.

While any form of latch may be employed to latch the door 1 open, I have preferably employed a rod 4, which projects through an opening 5 in the housing, which said opening also provides a slidway or guide for said rod in operation. As the rod 4 is designed to slide endways in its operation, a second slideway or guide 6 is provided attached to the frame underneath the housing. A stop 7 is attached to the rod which limits its outward movement by contact with the housing through which the rod passes. A spring 8 has one end attached to the rod, and the other to a suitable point on the frame of the housing to provide a tension for holding the bar 4 normally in the path of travel of the door 1 while closing. To set the door 1 open as shown in Figure 2, the rod 4 is pushed inward against the tension of the spring 8. The door is raised above the end of the rod 4, which is then released, and the spring returns it to its normal position, in which position, the door rests upon the rod, and is prevented from closing. To withdraw the rod automatically, and permit the closing of the door when the lure passes through, I have provided a bell crank 9 pivotally mounted upon the frame, with one end connected to the rod 4 by the chain 10, and the reverse end of the bell crank connected to the contact lever 11 by the chain 12. The lower end of the lever 11 is in line of passage of the electric car carrying the lure, and when the car passes, the lever is pushed backward, withdrawing the rod 4 out of line with the door 1, through means of the bell-crank 9 connecting said rod and lever. At the lower end of the lever 11, I have provided contact padding as fiber or the like at 13 to receive the impact of the car thereagainst. In the detail drawing Figure 4 I have shown the lever pivoted at its upper end in the frame at 14, with the chain 11 connected intermediary the pivot and the lower end as shown.

In operating my invention, after the car is backed out upon the circular rail track to start the race, the door 1 is opened, and the rod 4 is placed beneath to hold it open as shown in Figure 2. The switch is set to conduct the car on to the siding, whenever it is desired to terminate the race, and as the car passes on to the siding, the lure is carried through the open door 1. The frame of the car contacts with the contact lever 11, pushing it backward, until the bell-crank operated thereby pulls the bar 4 back to release the door 1. The door 1 then quickly closes under pressure of the spring actuated hinges 3, 3 and the force of gravity, and the lure is concealed within the housing, out of sight of the dogs.

Having thus described my invention, what I claim and desire to secure by Letters Patent, is the following:—

1. In a device of the class described, a door hinged at the top, a horizontally slidable rod arranged to extend beneath the door when the latter is open, a pendent releasing lever pivoted at its upper end and having its lower portion arranged to be struck by a moving car, and means for connecting the lever with the rod for withdrawing the same from beneath the open door when the said lever is struck by the car.

2. In a device of the class described, a door hinged at the top, a horizontally slidable rod arranged to extend beneath the door when the latter is open, a pendent releasing lever pivoted at its upper end and provided at its lower end with a pad adapted to be struck by a moving car, and means for connecting the lever with the rod for withdrawing the same from beneath the door to permit the latter to close when the lever is struck by a car.

3. In a device of the class described, a door hinged at the top, a horizontally slidable rod arranged to extend beneath the door when the same is opened, a pendent releasing lever pivoted at its upper end and having its lower portion arranged to be struck by a moving car, and a horizontally disposed bell crank lever connected with the inner end of the rod and with the upper portion of the lever for withdrawing the rod from beneath the door when the lever is actuated by a car.

4. In a device of the class described, a door hinged at the top, a horizontally slidable rod arranged to extend beneath the door when the same is opened, a releasing lever pivoted at its upper end and provided at the lower end with a pad and adapted to be struck by a car, and a horizontally disposed bell crank lever connected with the inner end of the rod and with the upper portion of the lever for withdrawing the rod from beneath the door when the lever is struck by a car.

5. In a device of the class described, the combination of a housing having an angle, a door mounted in the angle and arranged transversely of the housing, said door being hinged at the top, a supporting rod movable through the housing and arranged to project beneath the door when the latter is swung upwardly to its open position, a contact lever pivoted at its upper end and having its lower portion arranged to be struck by a moving car, and means for connecting the said member with the rod for withdrawing the same from beneath the open door when the lever is struck by the car.

In testimony whereof, I have duly signed the foregoing specification.

OWEN P. SMITH.